(12) United States Patent
Singh et al.

(10) Patent No.: US 7,386,565 B1
(45) Date of Patent: Jun. 10, 2008

(54) SYSTEM AND METHODS FOR AGGREGATING DATA FROM MULTIPLE SOURCES

(75) Inventors: Servesh Pratap Singh, Kanpur (IN); Amit Handa, Chandigarh (IN); Shreyas S. Kaushik, Karnataka (IN)

(73) Assignee: Sun Microsystems, Inc., Santa Clara, CA (US)

( * ) Notice: Subject to any disclaimer, the term of this patent is extended or adjusted under 35 U.S.C. 154(b) by 474 days.

(21) Appl. No.: 10/852,520

(22) Filed: May 24, 2004

(51) Int. Cl.
*G06F 17/30* (2006.01)
(52) U.S. Cl. .................................... 707/102
(58) Field of Classification Search .............. 707/1–10, 707/100–104.1, 200–206; 717/177
See application file for complete search history.

(56) References Cited

U.S. PATENT DOCUMENTS

2003/0009754 A1* 1/2003 Rowley et al. ............. 717/177

OTHER PUBLICATIONS

R. Taniguchi et al., Knowledge-based image processing system:IPS-SENS-II, 1989,IEEE Paper INSPEC: 3505677, pp. 462-466.*

Hugo Lui, "Unpacking Meaning form Words: A context-centered approach to computututional Lexicon design", Jul. 29, 2003, www.web.media.mit.ed, pp. 1-15.*

* cited by examiner

*Primary Examiner*—Diane Mizrahi
(74) *Attorney, Agent, or Firm*—Chapin IP Law, LLC; Barry W. Chapin, Esq.

(57) ABSTRACT

Computer systems often strive to retrieve and process data from multiple sources. Integration and processing of data from multiple data sources tends to increase processing demands and decrease throughput due to the additional deployment of computational resources for handling multiple sources. An executable entity, such as a bean, which accesses each data source by the location of the data objects, and retrieves data objects corresponding to rows of data, is operable to access a plurality of data sources independently of the storage medium (i.e. DBMS), or format, and aggregate multiple objects from each of the data sources into a set of compound objects, in which each compound object includes associated fields from the accessed objects of the individual data sources. The attributes of the rows (objects) from different data sources are matched according to a common attribute in each object, and the resulting compound object is aggregated into a compound object set, which represents each of objects from each of the data sources joined according to the common attribute.

31 Claims, 6 Drawing Sheets

SYSTEM AND METHODS FOR AGGREGATING DATA FROM MULTIPLE SOURCES

BACKGROUND

Conventional computer systems typically manipulate large amounts of data. Accordingly, modern managed information environments typically employ data storage and retrieval applications, such as relational database managers, as a vehicle for managing, indexing, and storing data. Such data storage and retrieval applications are commercially available from a variety of vendors, thus providing a broad range of storage and retrieval options. Each vendor of storage and retrieval applications, however, typically employs a proprietary storage format which is incompatible with the storage formats of other vendors.

For example, Oracle® Corporation, of Redwood Shoals, Calif., markets a relational database management system (RDBMS) having a particular format. Further, IBM Corporation of Armonk, N.Y., markets Informix®, an alternate database management system (DBMS) product having a different proprietary format. Often, large quantities of data are stored according to one format or another. Further, other user applications often employ a dedicated storage and retrieval format. Often, a widespread dissemination of a particular application affords a similar status to the file formats of such an application. For example, the .doc format employed by Microsoft® Word has attained widespread use as a common format by which to transfer information.

SUMMARY

Conventional computer systems are often required to retrieve and process data from multiple sources. With the multitude of modern applications commercially available, such conventional systems typically strive for the ability to incorporate data from multiple sources and/or vendors. For example, a corporate merger may require integration of a particular corporate database defined according to one database vendor, to be integrated with another corporate database defined by a separate database vendor. Accommodating a multiplicity of data storage formats, however, tends to increase cost and decrease performance due to increased software and processing to accommodate multiple formats.

Configurations of the invention are based, in part, on the observation that conventional integration and processing of data from multiple data sources tends to increase processing demands and decrease throughput due to the additional deployment of conventional computational resources for handling the data from multiple sources. In a conventional information processing environment, dissimilar data sources often require different software processes or threads corresponding to each of the data sources. For example, in a Java 2 Enterprise Edition (J2EE) server, executable entities called beans represent data and methods. Conventional executable entities operate on a particular application, such as a particular DBMS. Accordingly, multiple data sources trigger deployment of additional executable entities to handle each of the data sources.

Further, in a relational database, data is often stored in a tabular form of columns and rows. Data is then retrieved as objects, typically representing a row, in which each column corresponds to an attribute in the row. Accordingly, a large dataset having a large number of rows results in a correspondingly large number of executable entities, or beans. The additional executable entities (beans) become compounded with multiple data sources. Since conventional executable entities can operate on only a single data source, separate executable entities are employed for each row from each data source. Typically, a master bean operates for each data source, and references the other executable entities corresponding to the rows. Since a master bean, and a number of corresponding "row" beans are employed for each data set, complex operations involving multiple data sources tend to rapidly expand the number of beans employed.

Accordingly, the presently disclosed system substantially overcomes the above described shortcomings presented in accessing multiple data sources by defining an executable entity operable to access a plurality of data sources independently of the storage medium (i.e. DBMS), or format, and further operable to aggregate multiple objects from each of the data sources into a set of compound objects, each compound object including associated fields from the accessed objects of the individual data sources. The executable entity accesses each data source by identifying the location of the data objects, and then retrieves data objects corresponding to rows of data. The attributes of the rows from different data sources are matched according to a common attribute in each object, and the resulting compound object is aggregated into a compound object set. The resulting compound object set represents each of the objects from each of the data sources joined according to the common attribute, which defines the association between the objects of different data sources.

In the particular exemplary configuration disclosed herein, the server is a J2EE server and the executable entities are beans. Alternate arrangements of servers and executable entities may be employed in alternate configurations. The exemplary data sources are relational databases, such as an Oracle® and an Informix® database, each accessible by the same executable entity (bean) in accordance with the principles of the invention. The executable entity is operable to identify the location of the data sources and corresponding objects independent of the medium, or implementation, (e.g. relational database) by which the objects are stored. The executable entity retrieves the objects as normalized entities, or row sets, from each of the databases, and generates a compound object according to associations, or joins, between matching attributes which are common to both normalized entries.

In further detail the method of accessing a plurality of data sources by the system disclosed herein includes identifying a plurality of data sources (e.g. relational databases) having related data, in which the data sources each include data objects (e.g. rows) of normalized data according to an implementation mechanism, and enumerating, in each of the identified data sources, a common attribute, or match field, operable to define an association between objects of each of the data sources to objects of other identified data sources. The executable entity (bean) representing the aggregated data set identifies, for each of the data sources, an access method, the access method independent of the implementation mechanism, or DBMS, storing the data objects in the data source. The executable entity correlates, via the common attribute, the objects of the identified data sources according to the defined associations, such as matching values in the common attribute, and generates a compound object indicative of each of the data objects associated via the defined associations by the common attribute.

The executable entity identifies a location of each of the data sources, in which the location is independent of the implementation mechanism (DBMS) storing the objects, and identifies, based on the location, a common attribute within each of the data sources, in which the common attribute is operable as a match column for each of the identified data sources. The executable entity then accesses, via the access method and the location, each of the identified data sources to traverse the objects in each of the data sources. The executable entity identifies associated traversed objects according to the associations, and matches the common attributes of the traversed objects in each of the data sources to generate a compound object, in which the generated compound object is indicative of attributes of objects from each of the plurality of data sources. In the exemplary configuration below, in which the data sources are tables in relational databases, the generated compound object represents a join of the relational tables.

In particular configuration, the data sources are represented, via the executable entity, as a plurality of normalized data entries indicative of an object in the data source, in which each of the normalized data entries have at least one common attribute.

The disclosed system is further operable to build the executable entity indicative of the identified data sources and corresponding associations by identifying a normalized entry corresponding to a data source, and adding additional normalized entries, to be associated with the executable entity, from the identified data sources. Accordingly, the system defines aggregation instructions in the executable entity for matching corresponding fields based on the common attribute, generating a compound object indicative of a plurality of fields in each of the objects having the corresponding fields, and adding (i.e. aggregating) the generated compound object to the executable object, therefore resulting in the set of compound objects. The system, therefore, further includes defining instructions in the executable entity for identifying the location, and correlating the objects of the identified data sources, and instantiating the executable entity corresponding to the correlated objects, in which the correlated objects are collectively indicative of each of the identified data sources and defined associations.

In alternate configurations, operable in conjunction with the exemplary arrangement disclosed herein, the executable entity stores a plurality of generated compound objects in an external data set, in which the external data set corresponds to correlated data sources indicative of joining the plurality of data sources. Further, the executable entity avoids the instantiation of an additional executable entity corresponding to each normalized data entry represented from the data source, and further avoids instantiating a master bean corresponding to a plurality of instantiated executable entities, each indicative of a row, collectively representing the data source. Further, the exemplary implementation mechanism storing the data in the data source may include a flat file, relational DB, markup language, XML file, or other suitable persistent storage mechanism.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

It is to be understood that the system of the invention can be embodied strictly as a software program, as software and hardware, or as hardware alone. Example embodiments of the invention may be implemented within computer systems, processors, and computer program products and/or software applications such as operating system's and execution environments such as the Java Virtual Machine manufactured by Sun Microsystems Inc. of Palo Alto, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

In a conventional information processing environment, dissimilar data sources often require different software processes or threads corresponding to each of the data sources. For example, in a Java 2 Enterprise Edition (J2EE) server, executable entities called beans represent data and methods. Conventional executable entities operate on a particular application, such as a particular DBMS. Accordingly, multiple data sources trigger deployment of additional executable entities to handle each of the data sources.

Embodiments of the invention provide mechanisms and techniques that provide an executable entity, or bean, operable to access a plurality of data sources independently of the storage medium (i.e. DBMS), or format, and to aggregate multiple objects from each of the data sources into a set of compound objects, each compound object including associated fields from the accessed objects of the individual data sources. The executable entity accesses each data source by the location of the data objects, and retrieves data objects corresponding to rows of data. The attributes of the rows (object) from different data sources are matched according to a common attribute in each object, and the resulting compound object aggregated into a compound object set. The resulting compound object set represents each of the objects from each of the data sources joined according to the common attribute, which defines an association between the objects of different data sources.

In the particular exemplary configuration disclosed herein, the server is a J2EE server and the executable entities are beans. Alternate arrangements of servers and executable entities may be employed in alternate configurations. The exemplary data sources are relational databases, such as an Oracle® and an Informix® database, each accessible by the same executable entity (bean) in accordance with the principles of the invention. The executable entity is operable to identify the location of the data sources and corresponding objects independent of the relational database by which the objects are stored. The executable entity retrieves the objects as normalized entities, or row sets, from each of the databases, and generates a compound object according to associations, or joins, between matching attributes which are common to both normalized entries.

Figure 1:
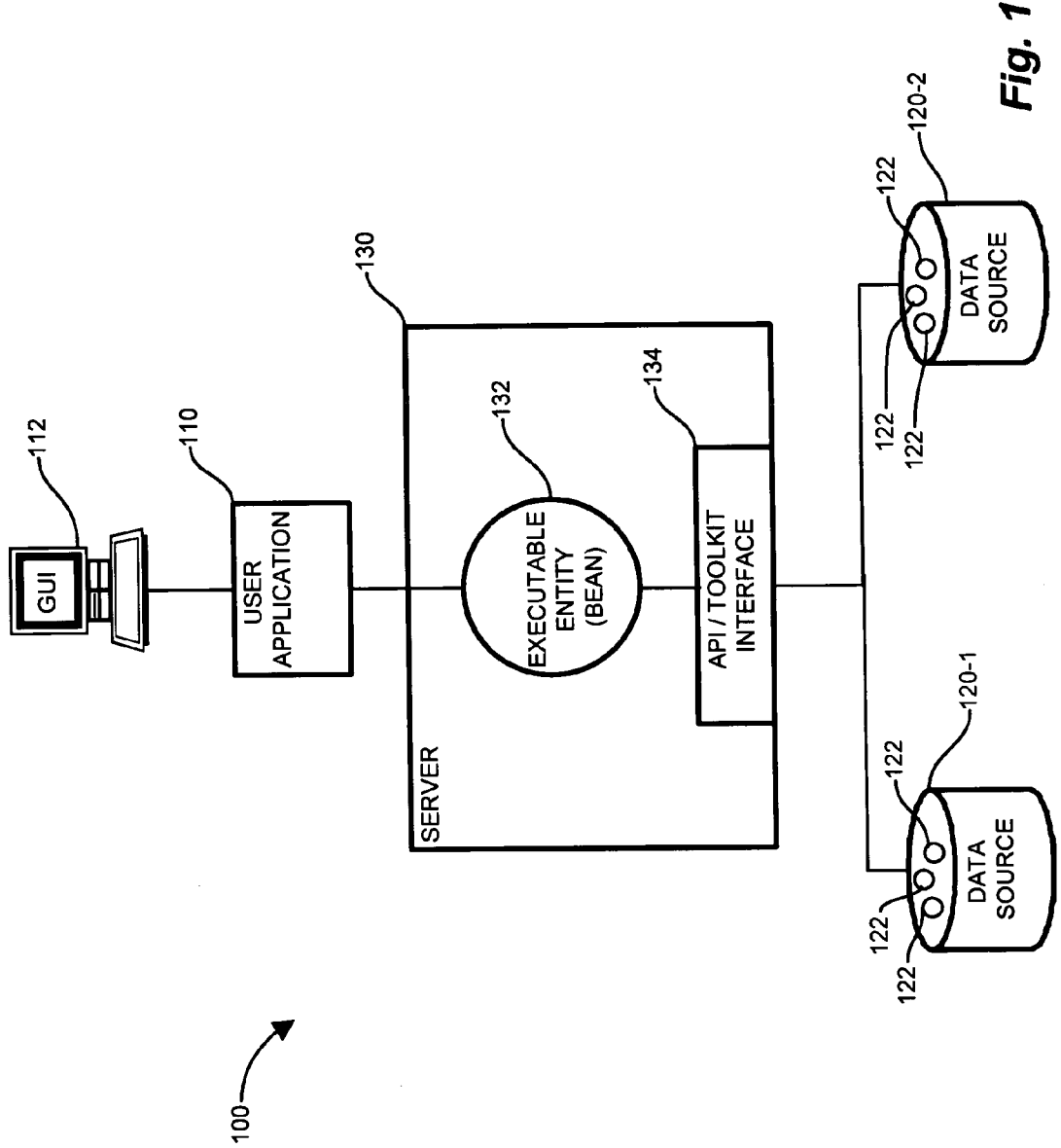
FIG. 1 is context diagram of data sources in a managed information environment suitable for use with the present invention.

FIG. 1 is context diagram of data sources 120 in a managed information environment 100 suitable for use with the present invention. Referring to FIG. 1, a user application 110 accesses a plurality of data sources 120-1 . . . 120-2 via a server 130. The server 130 includes an executable entity 132, such as a bean, coupled to an Application Programming Interface (API) 134 or toolkit interface to the data sources 120-1 . . . 120-2 (120 generally). In the exemplary configuration illustrated, the API 134 may be a Java Database Connectivity (JDBC) interface. The user access the user application via any suitable means, such as a Graphical User Interface 112, which may be co located with the server 130 and application 110 or may be remote. The executable entity 132 is operable to identify and access the data sources 120 by the location of the data sources and corresponding objects therein, independent of the medium, or implementation exhibited by the particular data source 120 by which the objects 122 are stored. For example, a first data source 120-1 may be an Oracle relational database and a second data source 120-2 may be an Informix relational database. By accessing the data sources 120 by location, and aggregating individual objects 122 in the executable entity 132, the user application 110 accesses multiple data sources 120 without being encumbered by different DBMS or other storage implementations by which the data is stored.

In the exemplary configuration shown, the server is a J2EE (Java 2 Enterprise Edition) server, marketed commercially by Sun Microsystems Inc. of Palo Alto, Calif., USA. Such servers are operable to include a plurality of the executable entities 132 known as beans. A variety of beans, each employing different properties, are available. For example, a so-called "Entity Bean" represents a business object in a persistent storage mechanism, such as a data source. A conventional entity bean relies on a relational database for such persistent storage. Further, persistence may be either bean managed persistence (BMP) or container managed persistence (CMP). While conventional CMP beans employ self contained relational database mechanisms, and therefore are difficult to modify, the BMP beans generally are available to include data source specific operations, such as getting and setting. Since a conventional BMP bean, however, represents a single row in such a relational DB table, accessing multiple data sources may be problematic.

Figure 2:
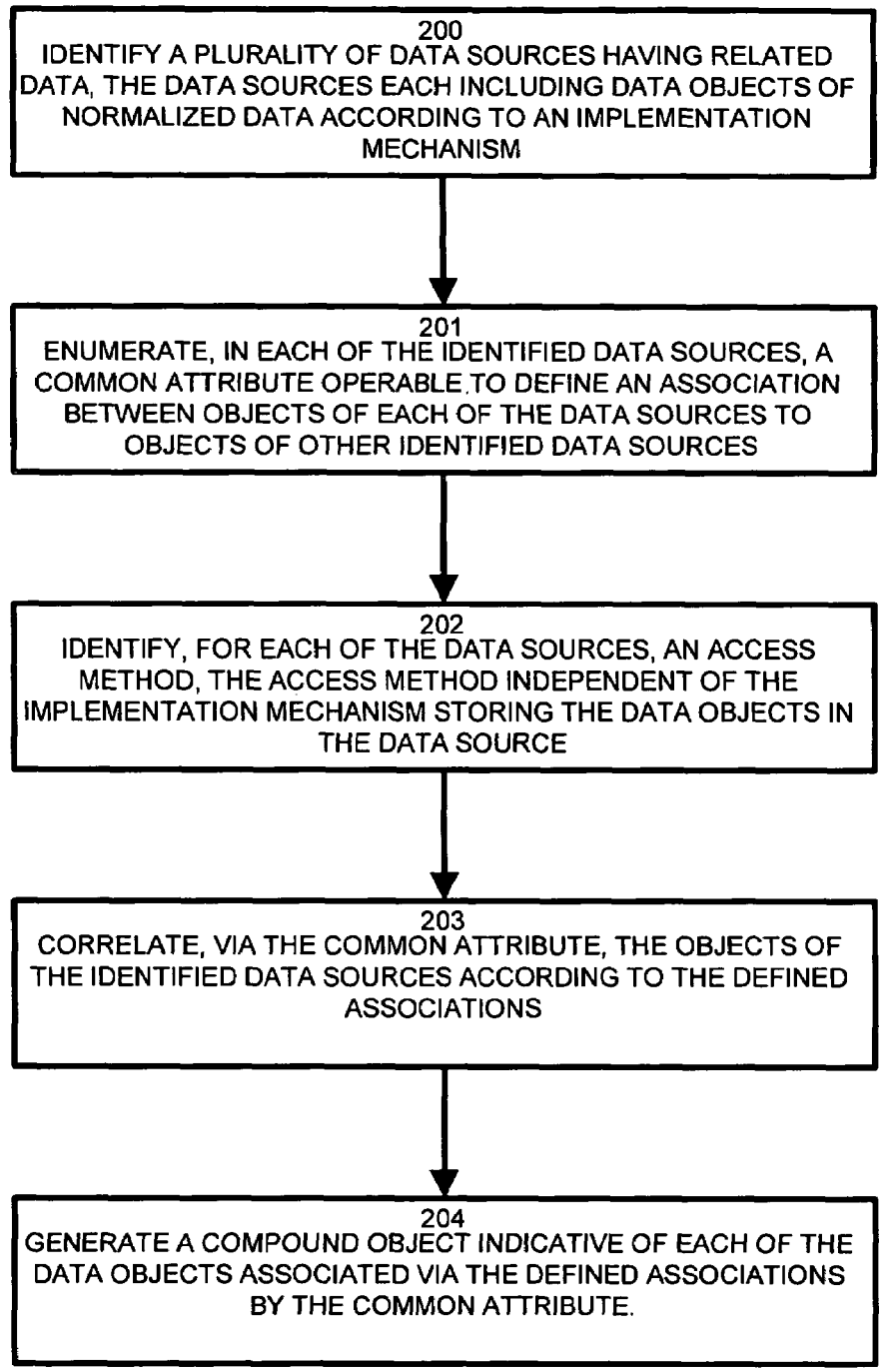
FIG. 2 is a flowchart of aggregation of data from multiple data sources in the environment of FIG. 1.

FIG. 2 is a flowchart of aggregation of data from multiple data sources in the environment of FIG. 1. Referring to FIGS. 1 and 2, the method of accessing a plurality of data sources includes identifying a plurality of data sources having related data, in which the data sources 120 each include data objects 122 of normalized data according to an implementation mechanism, as depicted at step 200. The data objects 122 are normalized, or demarcated into fields, according to the implementation mechanism exhibited by the data source 120. In a relational database, the data objects 122 correspond to rows in relational database tables, which may be expressed as rowsets, in which each data object represents a rowset. Alternate implementation mechanisms may include, by way of example only, flat files, XML and/or other markup language files.

The executable entity 132 enumerates, in each of the identified data sources 120, a common attribute operable to define an association between objects of each of the data sources to objects of other identified data sources, as disclosed at step 201. In a relational database table, the common attribute may be an attribute, or column, common to objects from both data sources 120. In such a scenario, the association may be a matching value between columns.

The executable entity 132 identifies, for each of the data sources, an access method, in which the access method is independent of the implementation mechanism storing the data objects 122 in the data source 120, as depicted at step 203. The access method allows the executable entity to access the objects 122 by location, rather than via the DBMS of the data source. In this manner, the executable entity 132 may avoid certain calls to the DBMS, such as explicit connect requests, which may encumber operations accessing more than a single data source 120.

The executable entity 132 correlates, via the common attribute, the objects of the identified data sources 120 according to the defined associations, as shown at step 204, such as by retrieving objects 122 from both data sources 120 having a matching common attribute. The executable entity 132 then generates a compound object indicative of each of the data objects associated via the defined associations by the common attribute, as depicted at step 205. Such a compound object includes, for example, attributes of both objects including the matching common attribute, an operation commonly known as a join operation. For example, one object may be indicative of an employee and department ID, and another object indicative of department ID and department description. The compound object includes the employee, department ID, and department description.

Figure 3:
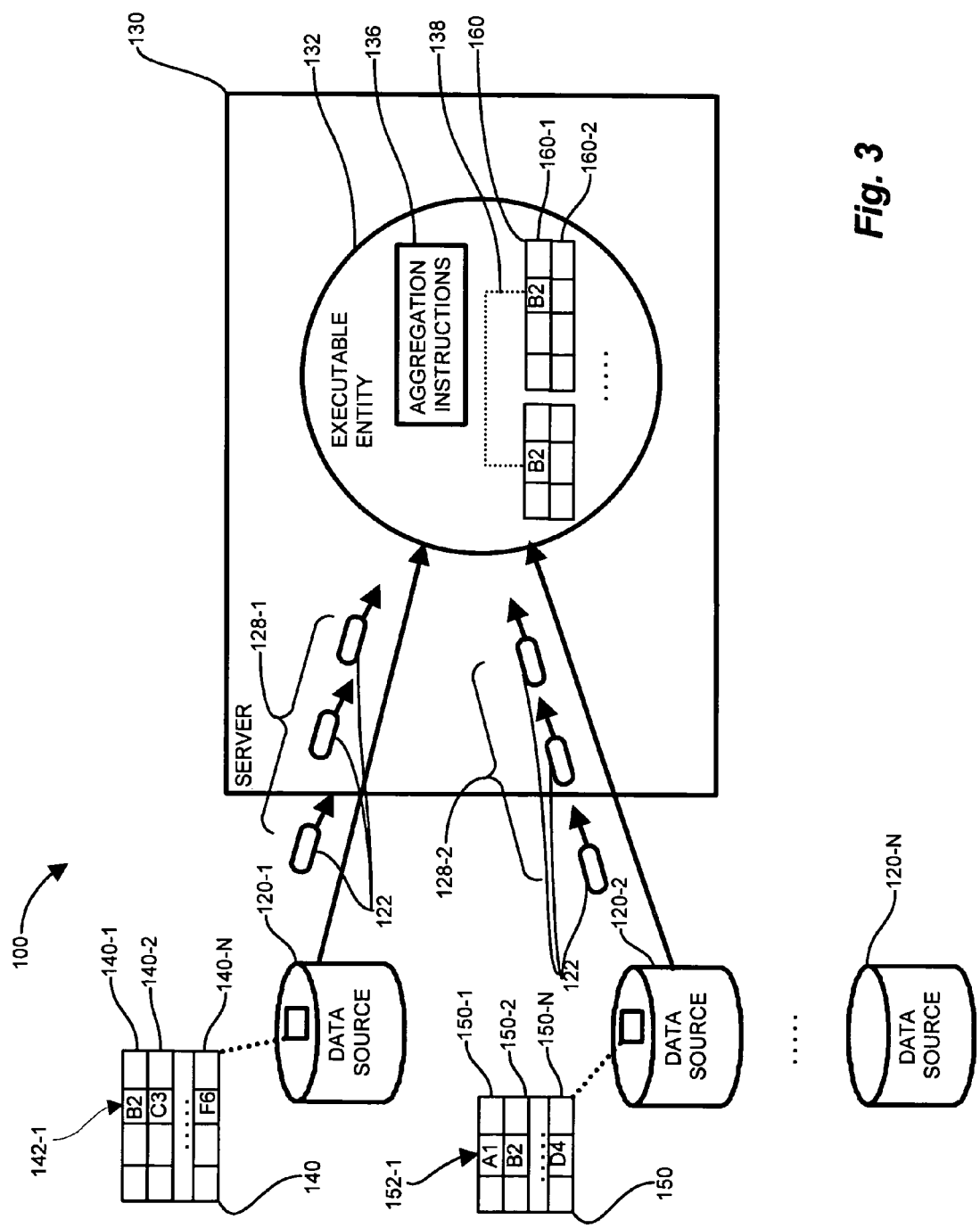
FIG. 3 shows a computer system in the environment of FIG. 1 accessing multiple data sources in greater detail.

FIG. 3 shows a computer system in the environment of FIG. 1 accessing multiple data sources 120 in greater detail. Referring to FIG. 3, the executable entity 132 accesses each of the data sources 120-1 and 120-2, discussed further below. The executable entity 132 includes aggregation instructions 136 for accessing the each of the plurality of data sources 120. In the exemplary arrangement shown, each of the data sources 120-1 . . . 120-2 contains tables 140, 150 respectively, each including rows 140-1 . . . N and 150-1 . . . N. The executable entity 132 retrieves objects 122 representing the rows 140-N, 150-N as normalized entries 128-1 and 128-2 respectively. The normalized entries 128-1 and 128-2 are correlated according to the aggregation instructions 136 and the associations, shown by dotted line 138, to form a set 160 of compound rows 160-1 ... 160-N (160, generally), as will now be described in greater detail.

Figure 4:
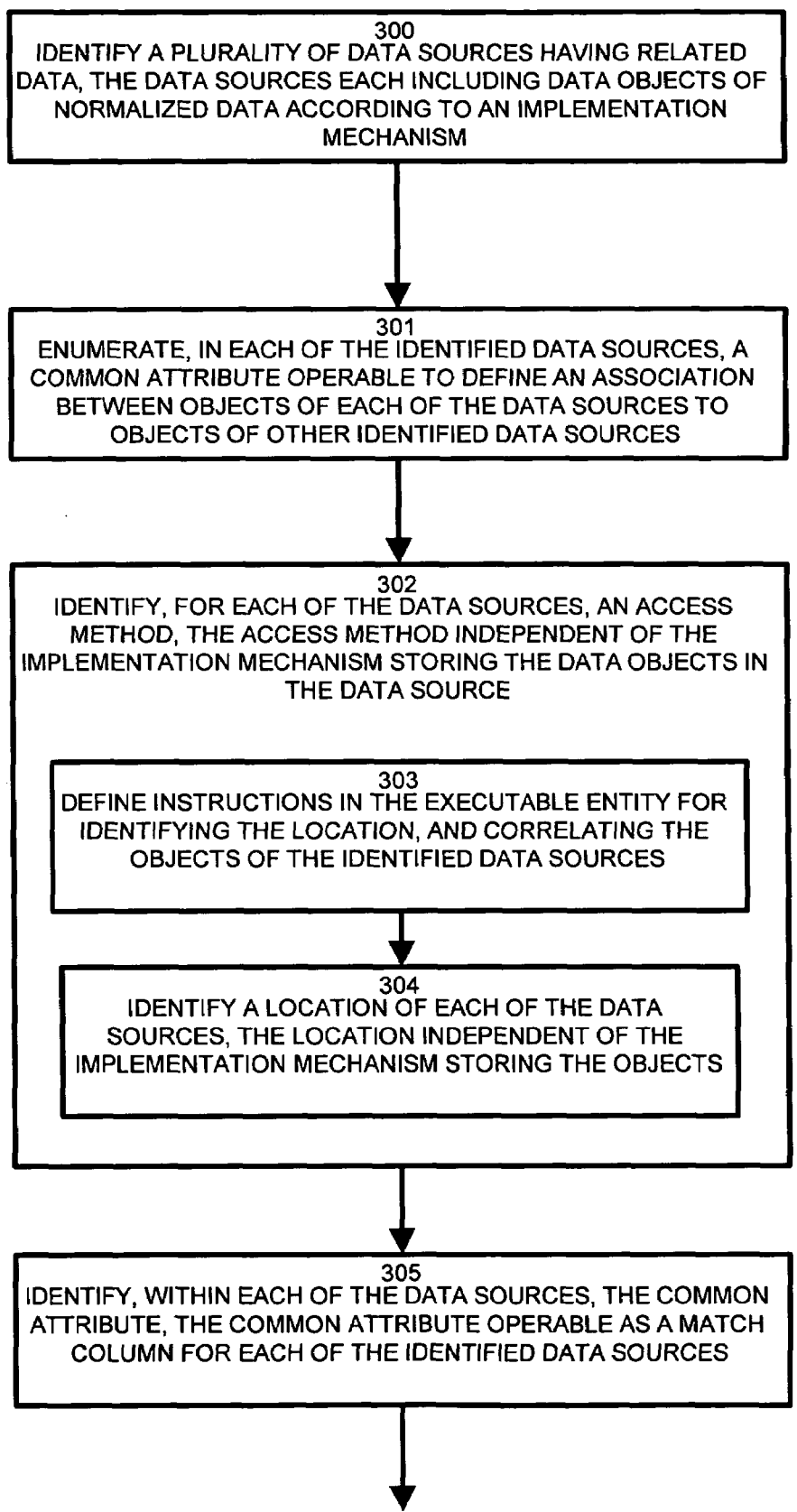
FIGS. 4-6 are a flowchart of aggregating data from multiple sources in the computer system of FIG. 3.
Figure 5:
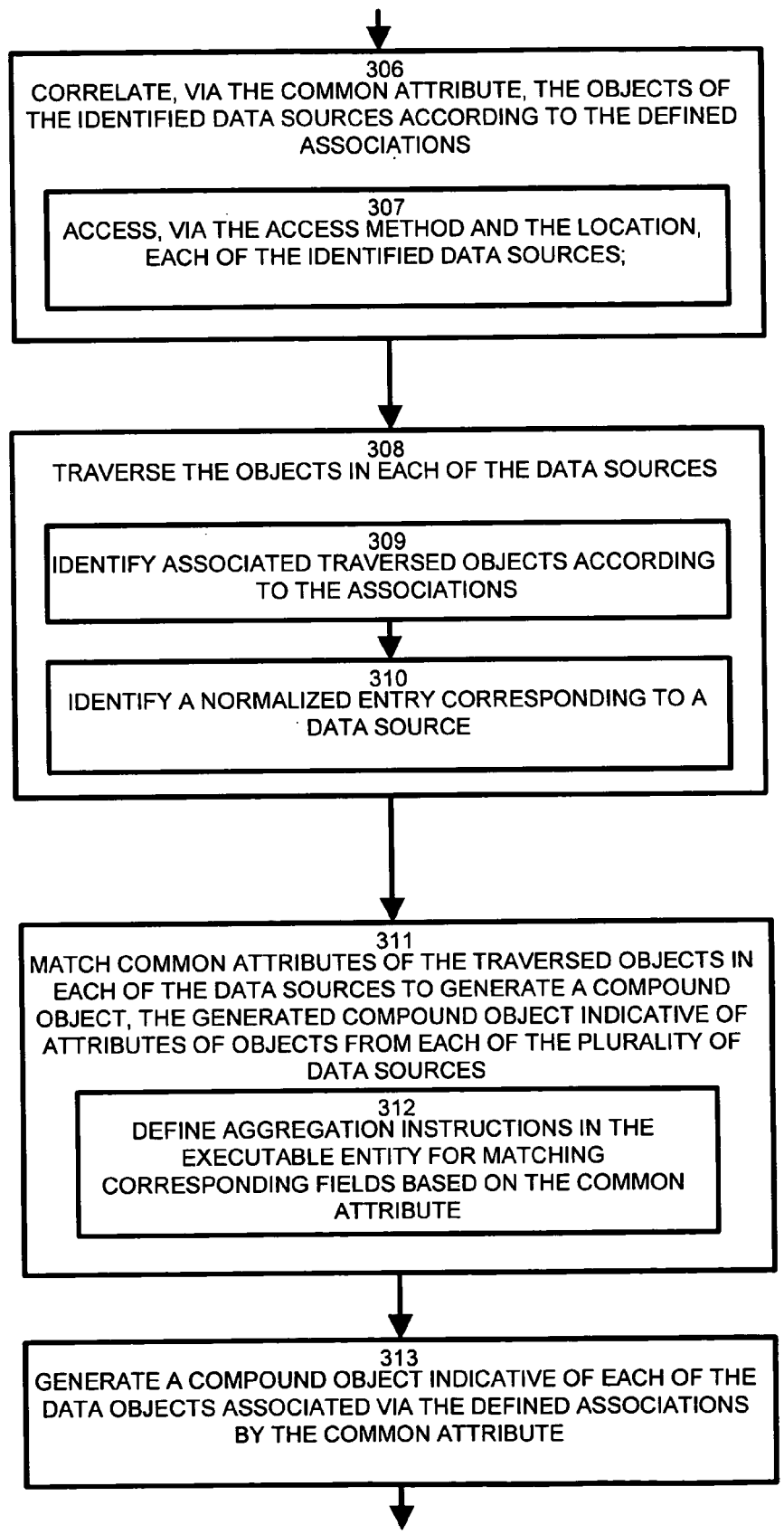
Figure 6:
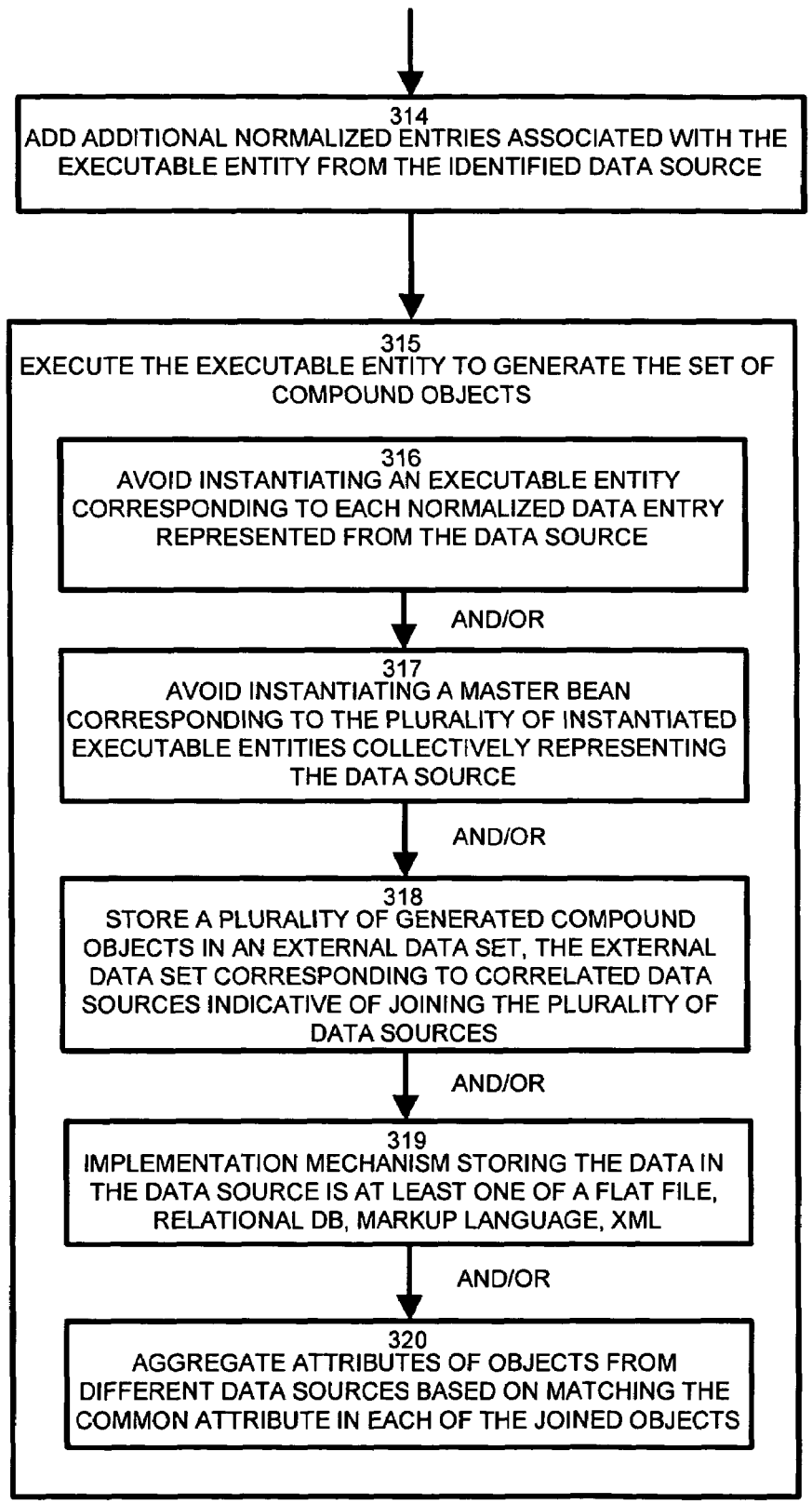

FIGS. 4-6 are a flowchart of aggregating data from multiple sources in the computer system of FIG. 3. Referring to FIGS. 3-6, the executable entity 132 represents the aggregation of the data from the multiple sources 120. In the exemplary arrangement shown, depicting a relational database configuration, the executable entity (bean) 132 on the server 130 represents a join of the data sources 120-1 and 120-2, in which each of the data sources 120 represents a different DBMS.

The server 130 identifies a plurality of data sources 120 having related data, in which the data sources 120 each include data objects 122 of normalized data 128 according to an implementation mechanism, such as a DBMS. The data sources 120-1 and 120-2 are shown as exemplary. Additional or other data sources 120-N may be employed in alternate configurations, such as XML files, flat files, or other types and formats of data.

The server 130 enumerates, in each of the identified data sources 140, 150, a common attribute 142-1 ... 152-1 operable to define the association 138 between objects 122 of each of the data sources 140, 150 to objects 122 of other identified data sources. The common attribute 142-1, 152-1 is typically employed as a match value against the objects 122 of the other data sources. Accordingly, the data sources 120 employ a set of objects 122, representing rows 140-1 ... 140-N and 150-1 ... 150-N which bears a similarity, or relation, to a set of objects 122 in other data sources 120.

The server 130 identifies, for each of the data sources 120, an access method, in which the access is method independent of the implementation mechanism, or DBMS, storing the data objects in the data source, as depicted at step 302. Identifying the access method includes defining aggregation instructions 136 in the executable entity 132 for identifying the location of the objects 122, and for correlating the objects 122 of the identified data sources, as depicted at step 303. In the exemplary arrangement disclosed, the executable entity, as described above, is a bean operable to access objects in each of the plurality of data sources 120. The instructions 136 identify a location of each of the data sources 120, in which the location is independent of the implementation mechanism storing the objects 122, as shown at step 304.

In a typical relational database implementation mechanism, accessing the objects 122 includes a database connect operation to the DBMS or other method implemented via the DBMS. Often, such DBMS methods may be exclusive of access methods of other DBMSs. Identification of the location of the objects 122 in the data source mitigates the need for an explicit DB connect or other DBMS specific method or operation. In each of the identified data sources 120, the executable entity 132 identifies a common attribute, 142-1, 152-1, in which the common attribute is operable as a match column for each of the identified data sources 120, as depicted at step 305. The common attribute, in a particular configuration, defines a join field, operable to implement a join between data, such as tables, from each of the data sources 120. Employing the identified common attribute 142-1,152-1 in each of the data sources, the executable entity 132 correlates, via the common attribute, the objects 122 of the identified data sources 120 according to the defined associations 138, as shown at step 306.

The correlation identifies associated objects 122 according to the association 138, typically a match operation. Therefore, correlating further includes, accessing, via the access method and the location, each of the identified data sources, as depicted at step 307. Accordingly, in the exemplary relational database data sources 120, the correlation identifies pairs of objects 140-1, 150-2 from each data source having a matching value in the common attribute, such as B2 in the example shown.

Performing the correlation further includes traversing the objects 122 in each of the data sources 120, as depicted at step 308. Traversing may be in a linear or sequential manner, or may be according to an index, hash, or other selective mapping operation. The executable entity 132 identifies associated traversed objects 120 according to the associations, as depicted at step 309, and identifies normalized entries 128-1, 128-2 corresponding to a data source 120-1, 120-2, respectively, as shown at step 310. In the exemplary arrangement, the associated traversed objects 120 are database rows 140-1 and 150-2 having matching common attributes 142-1, 152-1, and the normalized entry is the attributes of the row having the matching common attribute value B2 in the respective object 122 from each data source 120.

Matching the common attributes of the traversed objects 120 in each of the data sources therefore generate a compound object 160, in which, the generated compound object is indicative of attributes of objects 122 from each of the plurality of data sources 120-1, 120-2, as depicted at step 311. The compound object 160 therefore is an aggregation, or join, of each constituent object 122 including all attributes in both objects, or rows 140-1,150-2, as a single row 160-1. Accordingly, the executable entity 132 further includes instructions for matching corresponding fields 140-1, 150-2 based on the common attribute, as shown at step 312. The result, therefore, in the exemplary arrangement, is a compound object 160-1 indicative of a plurality of fields in each of the objects 140-1,150-2 having the corresponding fields, in which the compound object 160-1 includes attributes (fields) of each of the data objects 122 associated via the defined associations 138 by the common attribute, as disclosed at step 313.

The generated compound object 160-1 is added to the executable entity 132 in an iterative manner to aggregate each of the additional normalized entries 128 (i.e. joined objects) from each data source 120 to correspond to the executable entity 132, as depicted at step 314. In the exemplary arrangement disclosed, the aggregation of the compound objects 160-1 results in a compound object set 160 represented by the executable entity 132. The result is an instantiated executable entity 132 corresponding to the correlated objects 140-1,150-2, in which the correlated objects are collectively indicative of (i.e. retrieved from) each of the identified data sources 120-1, 120-2 and defined associations 138.

The instantiation or execution of the executable object 132 therefore generates the set of compound objects 160, as depicted at step 315. Further, the disclosed executable entity 132 avoids instantiating an executable entity corresponding to each normalized data entry 128 represented from the data source 120, as depicted at step 316, and further avoids instantiating a master bean corresponding to the plurality of instantiated executable entities collectively representing the data sources 120-N, as shown at step 317.

In alternate configuration, the executable entity 132 may further store a plurality of generated compound objects 160 in an external data set, in which the external data set corresponds to correlated data sources indicative of joining the plurality of data sources, as shown at step 318. In particular arrangements, the implementation mechanism storing the data in the data source may be a flat file, relational DB, markup language, XML file, or other representation capable of representing normalized object in a data source, as disclosed at step 319.

In the particular exemplary arrangement disclosed, the association 138 is a join between relational database tables, in which the join is operable to aggregate attributes of objects 122 from different data sources 120 based on matching the common attribute 142-1, 152-1 in each of the joined objects, as depicted at step 320. The exemplary implementation mechanism disclosed is a relational database management system (DBMS) operable on a plurality of database tables, each of the tables having rows and columns, and further operable for associations with others of the plurality of database tables according to a predetermined query language, such as SQL, as is known to those of skill in the art.

Those skilled in the art should readily appreciate that the programs and methods for accessing a plurality of data sources in an object based environment as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer. The operations and methods may be implemented in a software executable object or as a set of instructions. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for accessing a plurality of data sources has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of accessing a plurality of data sources comprising:
    identifying a plurality of data sources having related data, the data sources each including data objects of normalized data according to an implementation mechanism;
    enumerating, in each of the identified data sources, a common attribute operable to define at least one association between objects of each of the data sources to objects of other identified data sources, the common attribute further operable as a match column for each of the identified data sources;
    identifying, for each of the data sources, an access method, the access method independent of the implementation mechanism storing the data objects in the data source;
    correlating, via the common attribute, the objects of the identified data sources according to the defined associations; and
    generating a compound object indicative of each of the data objects associated via the defined associations by the common attribute, the compound object representative of the associated objects from each of the data sources.

2. The method of claim 1 further comprising identifying a location of each of the data sources, the location independent of the implementation mechanism storing the objects.

3. The method of claim 1 wherein correlating further comprises:
    accessing, via the access method and the location, each of the identified data sources;
    traversing the objects in each of the data sources;
    identifying associated traversed objects according to at least one of the defined associations; and
    matching common attributes of the traversed objects in each of the data sources to generate a compound object, the generated compound object indicative of attributes of objects from each of the plurality of data sources.

4. The method of claim 3 further comprising representing, via an executable entity, a plurality of normalized data entries indicative of an object in the data source, each of the normalized data entries having at least one common attribute.

5. The method of claim 4 further comprising storing a plurality of generated compound objects in an external data set, the external data set corresponding to correlated data sources indicative of joining the plurality of data sources.

6. The method of claim 5 wherein the implementation mechanism storing the data in the data source is at least one of a flat file, relational DB, markup language, XML.

7. The method of claim 5 wherein the association corresponds to a join between database tables, the join operable to aggregate attributes of objects from different data sources based on matching the common attribute in each of the joined objects.

8. The method of claim 7 wherein the implementation mechanism is a relational database management system operable on a plurality of database tables, each of the tables having rows and columns and further operable for associations with others of the plurality of database tables according to a predetermined query language.

9. The method of claim 1 further comprising building an executable entity indicative of the identified data sources and corresponding associations by:
    identifying a normalized entry corresponding to a data source; and
    adding additional normalized entries associated with the executable entity from the identified data source.

10. The method of claim 9 further comprising defining aggregation instructions in the executable entity for:
    matching corresponding fields based on the common attribute;
    generating a compound object indicative of a plurality of fields in each of the objects having the corresponding fields; and
    adding the generated compound object to the executable object.

11. The method of claim 10 further comprising defining instructions in the executable entity for identifying the location, and correlating the objects of the identified data sources.

12. The method of claim 11 further comprising instantiating the executable entity corresponding to the correlated objects, the correlated objects collectively indicative of each of the identified data sources and defined associations.

13. The method of claim 12 further comprising executing the executable entity to generate the set of compound objects.

14. The method of claim 11 further comprising avoiding instantiating an executable entity corresponding to each normalized data entry represented from the data source.

15. The method of claim 14 further comprising avoiding instantiating a master bean corresponding to the plurality of instantiated executable entities collectively representing the data source.

16. A server device having an encoded set of computer processor instructions on a computer readable storage medium which, when executed by a processor in a computer, cause the computer to access a plurality of data sources comprising:
   identifying a plurality of data sources having related data, the data sources each including data objects of normalized data according to an implementation mechanism;
   enumerating, in each of the identified data sources, a common attribute operable to define at least one association between objects of each of the data sources to objects of other identified data sources, the common attribute further operable as a match column for each of the identified data sources;
   identifying, for each of the data sources, an access method, the access method independent of the implementation mechanism storing the data objects in the data source;
   correlating, via the common attribute, the objects of the identified data sources according to the defined associations; and
   generating a compound object indicative of each of the data objects associated via the defined associations by the common attribute.

17. The server device of claim 16 further comprising identifying a location of each of the data sources, the location independent of the implementation mechanism storing the objects.

18. The server device of claim 17 further comprising identifying, within each of the data sources, the common attribute, the common attribute operable as a match column for each of the identified data sources.

19. The server device of claim 18 wherein correlating further comprises:
   accessing, via the access method and the location, each of the identified data sources;
   traversing the objects in each of the data sources;
   identifying associated traversed objects according to the associations; and
   matching common attributes of the traversed objects in each of the data sources to generate a compound object, the generated compound object indicative of attributes of objects from each of the plurality of data sources.

20. The server device of claim 19 further comprising representing, via an executable entity, a plurality of normalized data entries indicative of an object in the data source, each of the normalized data entries having at least one common attribute.

21. The server device of claim 20 further comprising storing a plurality of generated compound objects in an external data set, the external data set corresponding to correlated data sources indicative of joining the plurality of data sources.

22. The server device of claim 21 wherein the association is a join between database tables, the join operable to aggregate attributes of objects from different data sources based on matching the common attribute in each of the joined objects.

23. The server device of claim 22 wherein the implementation mechanism is a relational database management system operable on a plurality of database tables, each of the tables having rows and columns and further operable for associations with others of the plurality of database tables according to a predetermined query language.

24. The server device of claim 16 further comprising building an executable entity indicative of the identified data sources and corresponding associations by:
   identifying a normalized entry corresponding to a data source; and
   adding additional normalized entries associated with the executable entity from the identified data source.

25. The server device of claim 24 further comprising defining aggregation instructions in the executable entity for:
   matching corresponding fields based on the common attribute;
   generating a compound object indicative of a plurality of fields in each of the objects having the corresponding fields; and
   adding the generated compound object to the executable object.

26. The server device of claim 25 further comprising avoiding instantiating an executable entity corresponding to each normalized data entry represented from the data source.

27. The server device of claim 26 further comprising avoiding instantiating a master bean corresponding to the plurality of instantiated executable entities collectively representing the data source.

28. A system for aggregating data from multiple persistent sources comprising:
   a processor;
   a memory operable to instantiate and execute executable entities having instructions and methods encoded on a computer readable storage medium;
   an interface responsive to the processor and operable to access at least one data source, the processor further operable to:
      identify a plurality of data sources having related data, the data sources each including data objects of normalized data according to a persistent storage mechanism;
      enumerate, in each of the identified data sources, a common attribute operable to define an association between objects of each of the data sources to objects of other identified data sources, the common attribute further operable as a match column for each of the identified data sources;
      instantiate an executable entity in the memory for simultaneously accessing each of the identified data sources, the instantiated executable entity operable to aggregate the identified data sources by:
         identifying, by the executable entity, for each of the data sources, a normalized object set;
         computing, for each of the data sources, the location of the normalized object set therein, the location adapted to provide access to the object set independently of the persistent mechanism storing the data objects in the data source;
         traversing in each of the data sources, based on the computed location, at least one object including a common attribute, each of the objects in the object sets having the common attribute;
         correlating, via a matching value between the common attribute, the objects of different identified data sources;
         determining whether the correlating indicates a match between objects;

selectively generating, based on the determining, a compound object indicative of each of the data objects associated via the common attribute; and iterating through each of the objects in the identified object sets to build a compound object set having compound objects for each set of correlated objects having a matching common attribute value.

29. The system of claim 28 further comprising first and second data sources, the first and second data sources operable to provide persistent storage via a relational database, wherein the correlation is a join operation and the executable entity is an entity bean.

30. A computer program product having a computer readable storage medium operable to store computer program logic embodied in an encoded set of processor based instructions which, when executed by a computer, cause the computer to aggregate a plurality of data sources comprising:

identifying a plurality of data sources having related data, the data sources each including data objects of normalized data according to an implementation mechanism;

enumerating, in each of the identified data sources, a common attribute operable to define at least one association between objects of each of the data sources to objects of other identified data sources, the common attribute further operable as a match column for each of the identified data sources;

identifying, for each of the data sources, an access method, the access method independent of the implementation mechanism storing the data objects in the data source;

correlating, via the common attribute, the objects of the identified data sources according to the defined associations; and generating a compound object indicative of each of the data objects associated via the defined associations by the common attribute.

31. A server device for aggregating a plurality of data sources comprising:

means for identifying a plurality of data sources having related data, the data sources each including data objects of normalized data according to an implementation mechanism;

means for enumerating, in each of the identified data sources, a common attribute operable to define at least one association between objects of each of the data sources to objects of other identified data sources, the common attribute further operable as a match column for each of the identified data sources;

means for identifying, for each of the data sources, an access method, the access method independent of the implementation mechanism storing the data objects in the data source;

means for correlating, via the common attribute, the objects of the identified data sources according to the defined associations; and means for generating a compound object indicative of each of the data objects.

* * * * *